United States Patent [19]
Kenny

[11] 4,026,465
[45] * May 31, 1977

[54] TEMPERATURE-SENSITIVE SNAP-ACTION VALVE

[75] Inventor: Thomas M. Kenny, Paoli, Pa.

[73] Assignee: Ogontz Controls Company, Inc., Willow Grove, Pa.

[ * ] Notice: The portion of the term of this patent subsequent to Dec. 31, 1991, has been disclaimed.

[22] Filed: June 16, 1976

[21] Appl. No.: 696,755

Related U.S. Application Data

[62] Division of Ser. No. 514,428, Oct. 15, 1974, abandoned, which is a division of Ser. No. 472,095, May 22, 1974, Pat. No. 3,857,446.

[52] U.S. Cl. .............................. 236/48 R; 169/60
[51] Int. Cl.² ...................................... G05D 23/10
[58] Field of Search ..... 251/138; 236/48 R, 101 D, 236/101 E; 169/20, 60

[56] References Cited
UNITED STATES PATENTS

| | | | |
|---|---|---|---|
| 3,319,646 | 5/1967 | Smulka | 251/133 X |
| 3,857,446 | 12/1974 | Kenny | 137/468 X |
| 3,871,457 | 3/1975 | Livingston | 169/20 |

*Primary Examiner*—William E. Wayner
*Assistant Examiner*—William E. Tapolcai, Jr.
*Attorney, Agent, or Firm*—Howson and Howson

[57] ABSTRACT

A temperature-sensitive actuator is operatively connected to a valve by means of a spring-loaded linkage. The actuator causes a tensioned spring in the linkage to pass over center upon the occurrence of a predetermined temperature, thereby fully opening or closing the valve. The invention may be embodied in several forms including an automatic drain for water systems and a fire extinguishing system sprinkler control.

1 Claim, 16 Drawing Figures

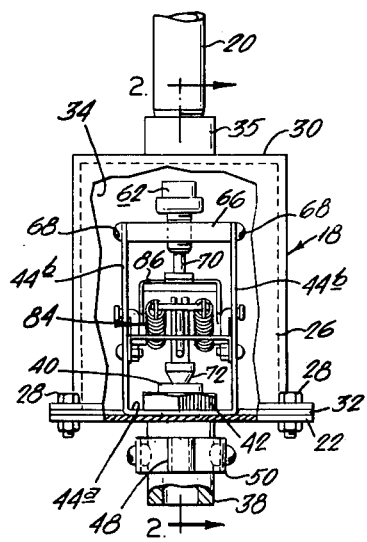
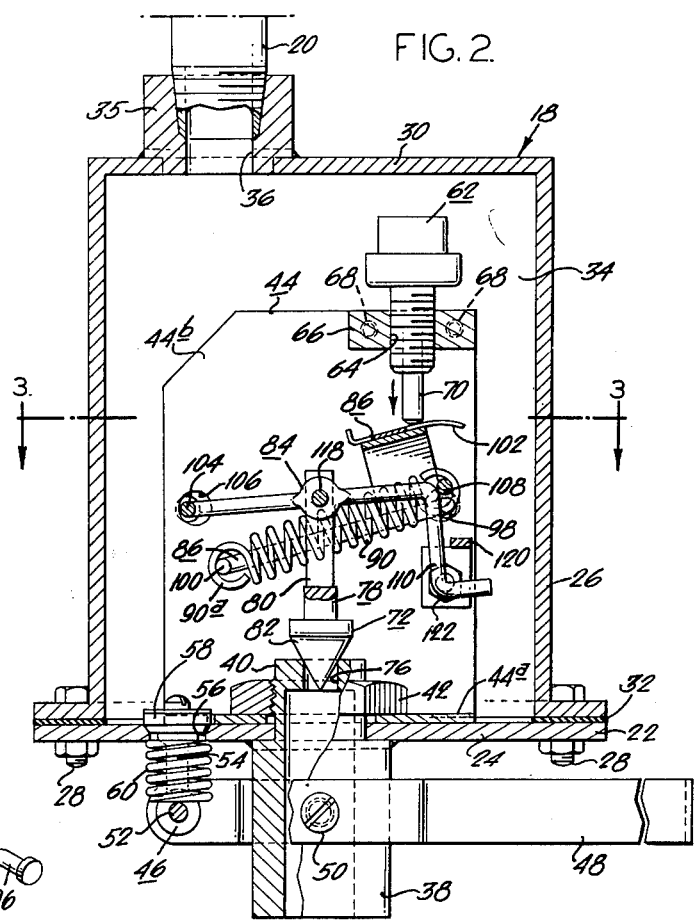
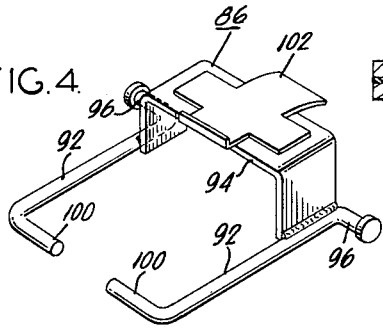
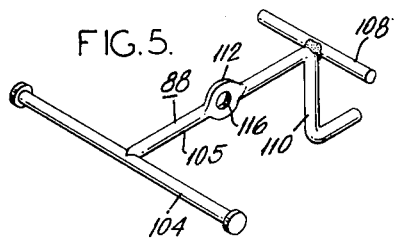
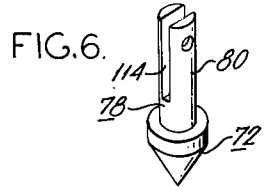
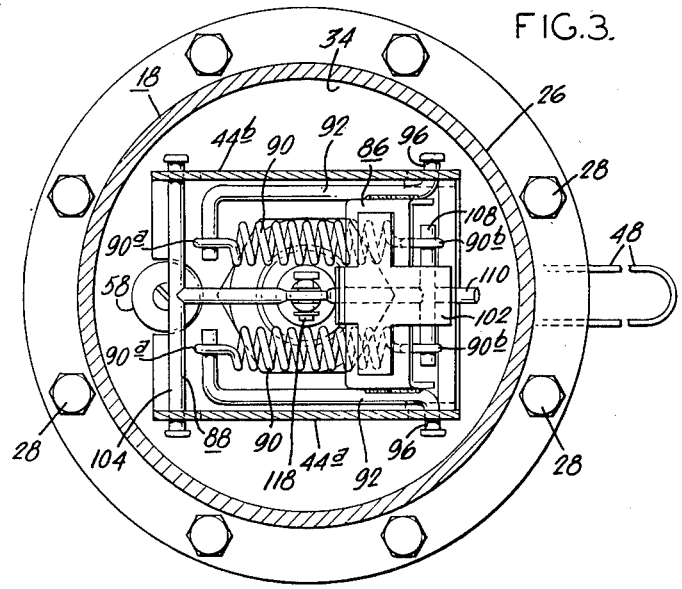

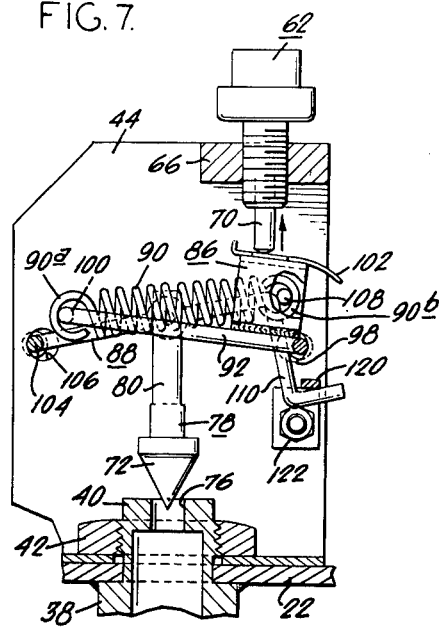
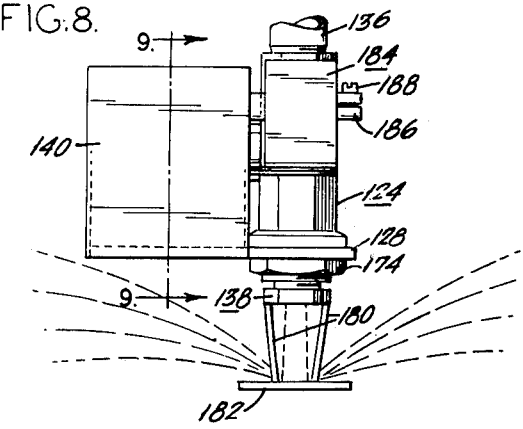
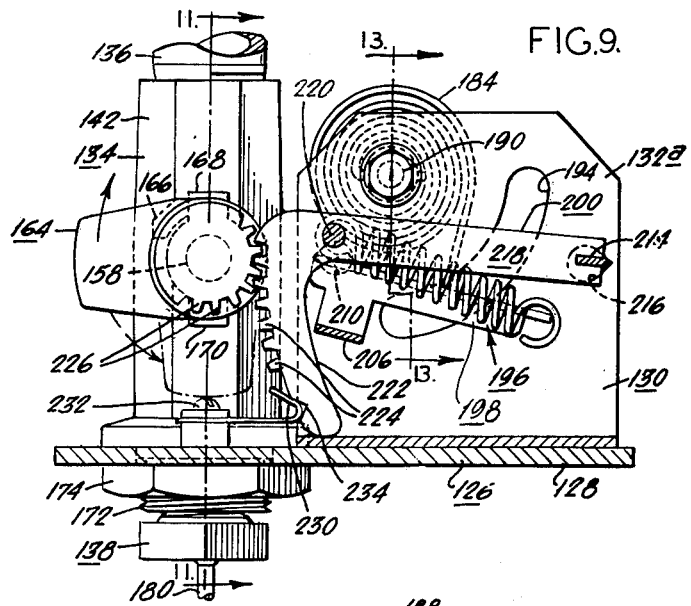
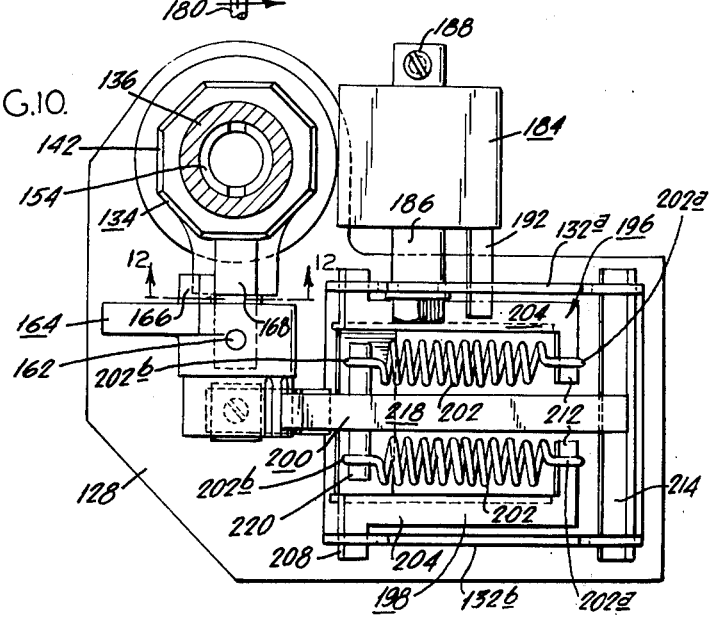

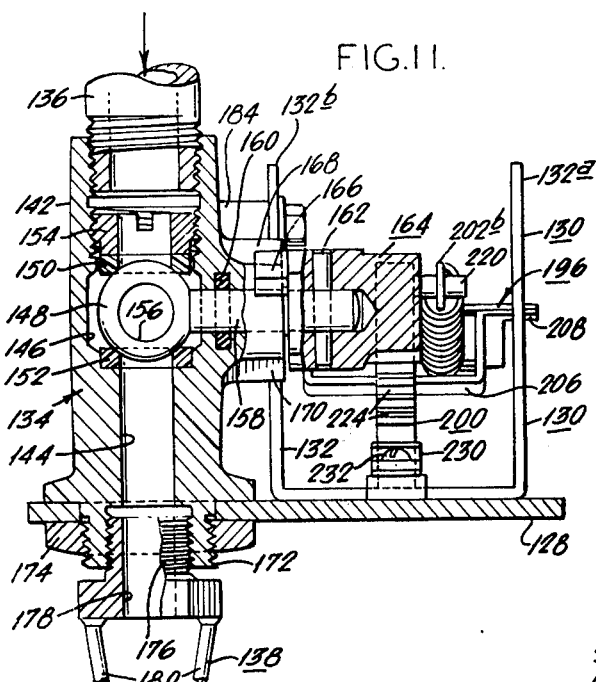
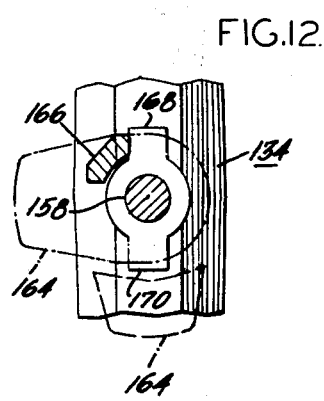
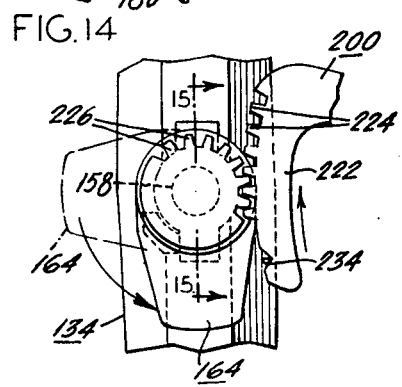
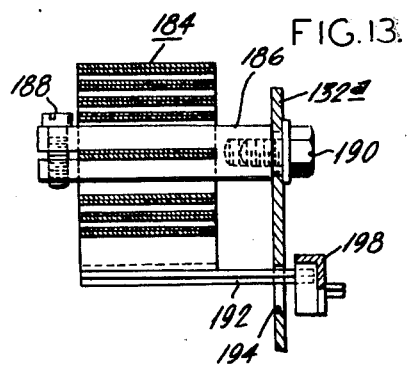
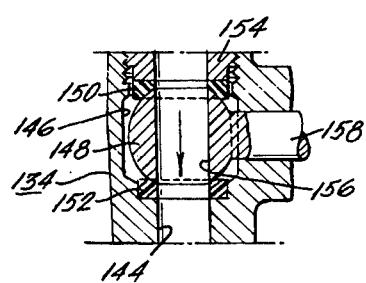
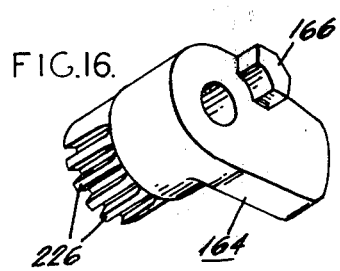

TEMPERATURE-SENSITIVE SNAP-ACTION VALVE

The present application is a division of application Ser. No. 514,428, filed 10-15-74, now abandoned, which was a division of applicaion Ser. No. 472,095, now U.S. Pat. No. 3,857,446, issued 12-31-74.

The present invention relates generally to automatic valve control mechanisms and relates more particularly to a novel temperature-sensitive snap-action valve.

There are many situations which require an arrangement for automatically opening or closing a valve when a predetermined temperature is reached. Examples include water lines exposed to freezing conditions such as on piers and water tanks. Similarly, locomotives and stationary engines utilize water cooling systems which in view of their large size and continuous operation, are not usually provided with an anti-freeze solution. Other examples include busses, cooling towers, mobile homes, outdoor safety showers, and the like which require an automatic drain valve to bleed the system before freezing damage occurs. Another category of valves requiring automatic thermal actuation is fire extinguishing system sprinkler valves which must reliably operate at a predetermined elevated temperature despite years of non-use. Sprinkler valves should preferably also close automatically when the temperature drops below a predetermined level.

Devices have previously been developed for automatically actuating valves in response to temperature change. However, various shortcomings have characterized the operation of most prior devices. In one form of automatic valve, the valve is opened slowly by the contraction of a medium within a thermal actuator. When used to guard against freezing, such a valve is often too slow in operation to prevent freezing at the valve orifice and a consequent blocking of the valve. Although an effective sprinkler valve controller has been developed utilizing a pilot valve for operating the main valve, such a unit is complex in structure and thus expensive to manufacture.

In the present invention, a relatively simple, mechanical arangement is provided for automatically fully opening or closing a valve when a predetermined temperature is reached. In brief, the invention comprises a base to which is secured a valve and a temperature-sensitive actuator which controls the valve through a spring-loaded linkage. The linkage includes an actuator member pivotally mounted on the base for pivotal movement by the actuator in response to temperature changes. A valve member pivotally mounted on the base is connected to the valve so that rotation of the valve member will open and close the valve. A tension spring extends between the valve member and actuator member, the spring normally serving to bias the valve member to hold the valve in the closed position. Upon occurrence of a predetermined temperature, the actuator rotates the actuator member to a degree sufficient to cause the spring to pass over-center with respect to the valve member, thereby rotating the valve member and opening the valve with a snap action. When the temperature returns to a predetermined level, the actuator will rotate the actuator member to cause the spring to again pass over-center, thereby causing the valve member to rotate and close the valve.

In view of the foregoing, it is accordingly a first object of the present invention to provide a temperature-sensitive snap-action valve of a novel mechanically actuated type.

A further object of the invetion is to provide a temperature-sensitive snap-action valve as described which is characterized by an over-center spring linkage which may be triggered by various types of temperature-sensitive actuators and which is adaptable for use with various types of valves.

Another object is to provide a temperature-sensitive snap-action valve as described which is readily adaptable for use in low temperature applications such as a drain valve to prevent freezing, or for high temperature applications such as for a fire extinguishing sprinkler system.

Still another object of the invention is to provide a temperature-sensitive valve as described which is spring-loaded into either a fully opened or fully closed position.

A still further object of the invention is to provide a temperature-sensitive valve as described of a relatively simple construction which may be economically manufactured.

Additional objects and advantages of the invention will be more readily apparent from the following detailed description of embodiments thereof when taken together with the accompanying drawings wherein:

FIG. 1 is an end elevational view of a temperature-sensitive snap-action valve assembly in accordance with the present invention with a portion of the casing thereof broken away to show interior details;

FIG. 2 is an enlarged sectional view taken along line 2—2 of FIG. 1;

FIG. 3 is a sectional view taken along line 3–3 of FIG. 2;

FIG. 4 is a perspective view of the actuator member of the valve assembly of FIGS. 1–3;

FIG. 5 is a perspective view of the valve member of the valve assembly of FIGS. 1–3;

FIG. 6 is a perspective view of the valve element of the valve of FIGS. 1–3;

FIG. 7 is a partial view similar to FIG. 2 but showing the valve in the open position;

FIG. 8 is an end elevational view of a further embodiment of the invention in the form of a fire extinguishing system sprinkler valve control;

FIG. 9 is an enlarged view taken along line 9—9 of FIG. 8 with the cover removed;

FIG. 10 is a plan view of the valve assembly shown in FIGS. 8 and 9;

FIG. 11 is a sectional view taken along line 11—11 of FIG. 9;

FIG. 12 is a partial sectional view taken along line 12—12 of FIG. 10 showing details of the valve stop;

FIG. 13 is a sectional view taken along line 13—13 of FIG. 9 showing details of the bimetallic coil actuator;

FIG. 14 is a partial view of the valve control member similar to the view of FIG. 9 but showing the valve in the open position;

FIG. 15 is a sectional view taken along line 15—15 of FIG. 14; and

FIG. 16 is a perspective view showing the valve control member.

Referring to the drawings, and particularly FIGS. 1–7 thereof, a temperature-sensitive snap-action valve assembly generally designated 18 is illustrated in the form of a drain valve for a fluid system (not shown) connected thereto by the conduit 20. The fluid system might, for example, comprise outdoor water lines which are intended to be automatically drained by the valve assembly should the temperature drop toward the freezing mark.

The valve assembly 18 comprises a base 22 including a circular base plate 24 to which a cylindrical casing 26 is secured by bolts 28. The casing 26 includes a closed top 30 and is sealed to the plate 24 by an annular gasket 32. A chamber 34 of cylindrical shape is accordingly formed by the casing 26 and the base plate 24.

The inlet conduit 20 is threadedly engaged within a boss 35 secured to the top 30 of the casing 26. A bore 36 in boss 35 connects the conduit 20 with the chamber 34 so that the chamber is continually filled with the system fluid. A drain conduit 38 extends downwardly from the base plate 24 and is secured thereto such as by welding. A reduced diameter portion 40 of the conduit 38 extends through a suitable bore in the base plate and is threaded to receive a nut 42 which serves to clamp the bracket 44 to the base plate 24.

A manual drain valve assembly 46 includes a handle 48 pivotally mounted at 50 to the drain conduit 38 and pivotally attached by pin 52 to a valve element 54 which extends vertically through a valve port and seat 56 in the base plate 24. The valve element 54 includes a resilient member 58 adapted to cooperate with the valve seat to tightly seal the drain valve in the usual closed position of the valve. A spring 60 disposed around the valve element 54 extends between the base plate 24 and the pivot pin 52 to bias the valve into a normally closed position. The depression of the handle 48 will raise the valve element 54 against the force of the spring 60 to permit the draining of the chamber 34.

The bracket 44 as shown most clearly in FIGS. 1 and 3 is of a U-shape and includes a base portion 44a, secured by the nut 42 to plate 24, and spaced parallel upstanding sidewall portions 44b. A temperature-sensitive actuator 62 is threadedly mounted in a suitable bore 64 of the horizontal actuator support member 66 which extends between the bracket walls 44b adjacent their upper edges, being secured thereto by screws 68. The temperature-sensitive actuator 62 illustrated is a commercially available unit of the type sold under the trade name "Vernatherm" by Scoville Manufacturing Co., Waterbury, Conn. The actuator includes an actuator piston 70 which extends from the actuator when the actuator is subjected to increasing temperatures, and which retracts into the actuator when the actuator is subjected to decreasing temperatures. The rate of travel and the displacement of the actuator piston 70 can be accurately predetermined and the actuators are obtainable for a variety of temperature conditions.

A valve assembly generally designated 72 is formed in the lower end of the chamber 34 by a restricted portion 74 of the outlet conduit 38 in which a concentric bore 76 is disposed, the upper edge of which forms a valve seat. A valve element 78 including a valve stem 80 and a conical poppet 82 normally in a sealing relation with the valve seat. The primary novelty of the invention resides in the mechanism employed for operatively connecting the temperature-sensitive actuator 62 with the valve element 78 to open the valve when the temperature drops below a certain minimum level. This mechanism comprises a spring linkage generally designated 84 which will now be considered in detail.

The linkage 84 comprises an actuator member 86 as shown in FIG. 4, a valve member 88 as shown in FIG. 5, and a pair of tension springs 90, 90 extending between the acutator member 86 and valve member 88.

The actuator member 86 includes a pair of spaced parallel rod-like elements 92 which are joined by cross member 94. The rod-like elements 92 each include outwardly projecting horizontal pivot portions 96 adapted to extend through holes 98 in the bracket walls 44b to pivotally support the actuator member about a horizontal axis. The elements 92 at their ends opposite the pivot portions 96 terminate in inwardly directed spring mounting portions 100 around each of which one end 90l of one of the springs 90 is attached as shown in FIGS. 1–3. An actuator slide plate 102 is mounted on the cross member 94 and slidably engages the piston 70 of actuator 62 as shown in FIG. 2. Since the actuator axis is positioned to the left of the pivot holes 98 as viewed in FIG. 2, the extension of the actuator piston 70 will rotate the actuator member 86 in a counterclockwise direction. The spring force always serves to rotate the actuator member 86 in a clockwise direction, thereby maintaining the engagement of the actuator plate 102 with the actuator piston 70.

The valve member 88 as shown in FIG. 5 includes a horizontal pivot bar 104, the ends of which extend through holes 105 in the bracket sidewalls 44b to provide a horizontal pivot axis for the valve member. The valve member further includes a central rod-like member 106 extending perpendicularly from the bar 104 and having a transverse spring connector bar 108 attached at one end thereof parallel to the bar 104. The member 106 is formed with an L-shaped portion 110 depending downwardly beneath the spring attachment arm 108 for a purpose described below. A flattened portion 112 of the member 106 is adapted to slidably fit within a slot 114 in the valve stem 80, and a bore 116 in the portion 112 permits a pivotal connection with the valve stem 80 by means of pivot pin 118 as shown in FIG. 2. The ends 90b of spring 90 are looped around the spring connector bar 108 to each side of the member 106 and accordingly place the springs in a constant state of tension.

A stop member 120 extending between the bracket sides 44b and secured thereto by bolts 122 limits the upward pivotal movement of the valve member 88 by engagement with the L-shaped portion 110 thereof as shown in FIG. 7. In this position, the valve element 78 is raised sufficiently to fully open the valve port 76.

With the valve element 78 in the closed position on the valve seat as shown in FIG. 2, the spring bar 108 is disposed above the pivot holes 98 of the actuator member 86 so that the springs 90 urge the actuator member in a clockwise direction and thus hold the plate 102 against the actuator piston 70. Since the position of the valve member 88 in FIG. 2 is the lowermost possible of that member, it can be appreciated that the spring force will always act to produce a clockwise rotation of the actuator member.

The rotation of the valve member 88 and hence the opening and closing of the valve is effected by the force of the springs 90 acting on the spring bar 108. When the ends 100 of the actuator member are disposed below the plane passing through the pivot bar 104 of the valve member 88 and the spring bar 108, the spring force will act to urge the valve into a closed position as illustrated in FIG. 2. When the actuator piston 70 moves upwardly permitting clockwise rotation of the actuator member 86, the ends 100 of the actuator member will pass to the other side of the plane passing through the valve member pivot bar 104 and spring bar 108, thereby causing the springs 90 to pass over center and, with a snap action, reverse the spring force on the valve member 88. The valve will accordingly open with a quick motion when the spring passes over center, even though the actuator 62 may have moved very slowly with a consequent slow rotation of the actuator member 86.

In operation, the assembly is connected with a fluid source by means of the inlet conduit 20, so that the fluid fills the chamber 34 and thereby immerses the temperature-sensitive actuator 62. With the temperature above a predetermined minimum level, the actuator plunger 70 will bear downwardly on the actuator member 86, holding the spring below the critical valve member plane described above. Any increased downward movement of the actuator plunger 70 will simply rotate the actuator member 86 in a counterclockwise direction without in any way affecting the valve condition. Should the temperature drop to the predetermined critical level, the actuator plunger 70 will retract in an upper direction, permitting the springs 90 to rotate the actuator member 86 until the ends 100 thereof pass across the plane defined by the valve member pivot bar 104 and the spring bar 108. At this point, the spring force on the valve member is reversed and the springs act upwardly on the valve member 88 rotating the valve member in a counterclockwise direction and opening the valve element connected thereto. This counterclockwise rotation of the valve member will continue at a rapid rate until the L-shaped arm 110 of the valve member 88 engages the stop bar 120 as shown in FIG. 7. The valve is then fully open and will remain fully open until the temperature rises to a predetermined level causing the actuator piston 70 to extend downwardly and move the spring attachment ends 100 of the actuator member 86 back across the valve member plane. The springs will then again pass over center and the valve will close with the same snap action with which it opened, even though the actuator movement may be very gradual.

For a manual draining of the system or simply to check on the filled condition of the chamber 34, the handle 48 is depressed to open the valve element 54 against the force of spring 60. A release of the handle 48 permits the spring 60 to reseat the valve element 54, effectively resealing the chamber 34.

The embodiments of FIGS. 8–16 is virtually identical in operational concept, although differing in the type of actuator and valve utilized. Referring to FIGS. 8–11, a temperature-sensitive snap-action valve assembly 124 embodying the invention is shown in the form of an automatic fire extinguishing system sprinkler valve. The valve assembly 124 includes a base 126 comprising an irregularly shaped base plate 128 and a U-shaped bracket 130 mounted thereon. The bracket 130 includes a spaced parallel upstanding sidewalls 132a and 132b similar to the sidewalls 44b of the previously described embodiment. A ball valve assembly generally designated 134 is mounted vertically on the base plate 128 and is connected at its upper end to a pressurized water conduit 136. A splash plate assembly 138 is connected below the ball valve 134 as shown in FIG. 8 to direct the spray of water in all directions when the ball valve is automatically opened by the temperature-sensitive mechanism described below. This mechanism is largely enclosed by a cover 140 in the view of FIG. 8, although in FIGS. 9, 10 and 11, the cover is removed to show the mechanism details.

The ball valve assembly 134 includes a valve body 142 of generally octagonal section having a bore 144 passing vertically therethrough. An enlarged ball chamber 146 within the body 142 contains the valve ball 148 which is sealed by upper and lower seal rings 150 and 152 in a conventional manner. Threaded retainer 154 above the upper seal ring 150 secures the ball in fluid tight relationship within the body. A central passage 156 in the ball provides a continuation of the valve body bore 144 when the ball is rotated into the open position as illustrated in FIG. 15. The rotation of the ball is effected by means of valve stem 158 which extends transversely through the valve body and is sealed by the seal ring 160. The valve stem 158 is connected by pin 162 to the geared valve control member 164 as shown most clearly in FIG. 15. A stop element 166 on the member 162 cooperates with the vertical flanges 168 and 170 of the valve body to limit rotation of the ball to 90°.

The ball valve assembly 134 is secured to the base plate 128 by means of a threaded portion 172 of the valve body which extends through a bore in the plate and secured thereto by the nut 174. The splash plate assembly 138 includes a threaded head portion 176 which is secured within an enlarged portion of the lower end of valve body bore 144. A concentric bore 178 in the head portion 176 forms a continuation of the valve body bore 144. A plurality of thin rod-like members 180 depend downwardly from the head portion 176 and support a splash plate 182 (FIG. 8) in a substantially horizontal plane.

The mechanism for actuating the ball valve is mounted on or within the bracket 130. The temperature-sensitive actuator in this embodiment comprises a bimetallic coil 184, one end of which is clamped within the split rod 186 and secured thereto by screw 188 as shown in FIG. 13. The rod 186 is fastened by means of bolt 190 to the sidewall 132a of bracket 130. Arm 192 attached to the free end of the bimetallic coil 184 extends through an arcuate slot 194 in the bracket sidewall as shown in FIG. 13.

Within the bracket 130, a spring linkage generally designated 196, which is quite similar to the spring linkage 84 of the previously described embodiment, includes actuator member 198, valve member 200, and tension springs 202, 202 connecting the actuator and valve members. The actuator member 198 includes a pair of parallel arms 204 joined by the connector portion 206. Pivot arms 208 extending transversely from the actuator member adjacent the connector portion 206 are disposed in openings 210 in the bracket sidewalls 132a and 132b. Inwardly directed spring connecting arms 212 at the free ends of the arms 204 provide attachment means for the ends 202a of the springs 202.

The valve member 200 comprises a horizontal pivot bar 214, the ends of which are pivotally disposed in holes 216 in the bracket sidewalls 132a and 132b. A central arm 218 of the valve member 200 includes a transverse spring bar 220 extending therethrough to which the ends 202b of the springs 202 are attached. The arm 218 continues beyond the spring bar 220 in a downwardly directed arcuately shaped portion 222 having gear teeth 224 disposed along the outer surface thereof in engagement with gear teeth 226 of the valve control member 164. A clockwise rotation of the arm 218 about the pivot holes 216 will rotate the valve control member 164 and hence the valve stem 158 and valve ball 148 in a counterclockwise direction as viewed in FIG. 9 and will open the valve.

With the valve in the closed position as shown in FIG. 9, the spring bar 220 is disposed above the pivot holes 210 of the actuator member 198. Accordingly, the force of the tension springs will always serve to urge the actuator member in a counterclockwise direction, thereby maintain engagement of the actuator member with the arm 192 extending from the bimetallic coil. The bimetallic coil will thus always control the rotational position of the actuator member 198 and thus also control the position of the ends 202a of the springs 202.

In the position shown in FIG. 9, the springs 202 are acting on the spring bar 220 at an angle serving to urge the valve member 200 in a counterclockwise rotational direction since the spring ends 202a are disposed below the plane passing through the spring bar 220 and the pivot bar 214. Upon a predetermined rise in temperature, the bimetallic coil 184 will expand, thereby raising the arm 192 and allowing the actuator member 198 to rotate in a counterclockwise direction. When this rotation continues to the degree required to permit the spring ends 202a to cross the plane passing through the spring bar 220 and the pivot arm 214, the springs will pass over center and instead of exerting a downward force on the valve member 200, will exert an upward force on the valve member, thereby urging the valve member to rotate in a clockwise direction.

Since the spring force urging such clockwise rotation of the valve member will increase the higher the ends 202a of the springs are permitted to travel by the actuator member, and in view of the possibility of the ball valve becoming tight after a long period of non-use, means are provided to hold the valve member in the closed position until a predetermined spring force has been reached. This means as shown in FIGS. 9 and 11 comprises spring member 230 secured to the space plate 128 by screw 232. A notch 234 in the valve member arm 222 engages a looped portion of the spring 230 in the closed position of the valve. When a suitable force of the springs 202 has been achieved, the spring 230 will release from the notch 234, permitting the rapid clockwise rotation of the valve member 200 and hence the valve control member 164 to open the valve with a snap-action.

When the temperature falls below a predetermined level, the mechanism will reset automatically. The actuator member will rotate causing the springs 202 to pass back over center, thus acting on the valve member to rotate the valve ball into the closed position.

Manifestly, changes in details of construction can be effected by those skilled in the art without departing from the spirit and the scope of the invention.

I claim:

1. A temperature-sensitive snap-action valve comprising a base, a fluid conduit connected with said base, a ball valve in said fluid conduit for controlling flow therethrough, a valve stem extending from said ball valve, gear means connected to said valve stem, a temperature-sensitive actuator mounted on said base, and a spring linkage assembly operatively connecting said actuator with said ball valve, said spring linkage assembly comprising a valve member pivotally mounted on said base, an arcuate gear-toothed portion of said valve member having its axis concentric with the pivot axis of said valve member, said gear toothed portion being cooperatively engaged with said valve stem gear means whereby pivotal movement of said valve member produces rotational movement of said valve stem and an opening or closing movement of said ball valve, an actuator member pivotally mounted on said base for rotation about an axis spaced from and parallel to the pivot axis of said valve member, said actuator operatively engaging said actuator member to provide rotation of said actuator member in response to temperature variations, and a tension spring having one end thereof attached to said actuator member at a point remote from its pivot axis, the opposite end of said spring being connected to said valve member at a point remote from its pivot axis, said spring urging said actuator member in rotation toward said actuator, said spring normally urging said valve member in rotation to hold said ball valve in a fully opened or fully closed position, said spring passing over center upon a predetermined temperature condition to urge said valve member in the opposite rotational direction, thereby fully closing or opening said ball valve with a snap action.

* * * * *